(12) United States Patent
Keck

(10) Patent No.: US 7,685,954 B2
(45) Date of Patent: Mar. 30, 2010

(54) HIGH SPEED, MULTI-UNIT, ARTICULATED SURFACE EFFECT SHIP

(75) Inventor: Larry Bradly Keck, Winter Garden, FL (US)

(73) Assignee: Keck Technologies, LLC, Raleigh, NC (US)

(*) Notice: Subject to any disclaimer, the term of this patent is extended or adjusted under 35 U.S.C. 154(b) by 773 days.

(21) Appl. No.: 11/548,472

(22) Filed: Oct. 11, 2006

(65) Prior Publication Data

US 2009/0071391 A1 Mar. 19, 2009

(51) Int. Cl.
*B63B 3/08* (2006.01)

(52) U.S. Cl. ............. 114/77 R; 114/67 R; 114/288

(58) Field of Classification Search ........... 114/61.1, 114/67 A, 67 R, 77 R, 249, 288, 289, 290, 114/271

See application file for complete search history.

(56) References Cited

U.S. PATENT DOCUMENTS

| | | | |
|---|---|---|---|
| 731,110 A * | 6/1903 | Larr | 114/249 |
| 3,044,432 A | 7/1962 | Wennagel | |
| 3,065,723 A | 11/1962 | Tulin | |
| 3,788,263 A | 1/1974 | McDermott | |
| 3,799,100 A | 3/1974 | Marriner | |
| 3,822,667 A * | 7/1974 | Marriner | 114/249 |
| 3,917,022 A | 11/1975 | Brooks | |
| 4,137,987 A | 2/1979 | Plackett | |
| 4,535,712 A | 8/1985 | Matthews | |
| 4,660,492 A | 4/1987 | Schlichthorst | |
| 5,072,685 A | 12/1991 | Kaucic | |
| 5,105,898 A | 4/1992 | Bixel | |
| 5,111,763 A | 5/1992 | Moerbe | |
| 5,146,863 A | 9/1992 | Ford | |
| 5,176,095 A | 1/1993 | Burg | |

(Continued)

FOREIGN PATENT DOCUMENTS

WO WO 03/095297 11/2003

OTHER PUBLICATIONS

"Queer Ships" (undated prior art; citation not available).

(Continued)

*Primary Examiner*—Lars A Olson
(74) *Attorney, Agent, or Firm*—Ferdinand M Romano, Esq.; Beusse Wolter Sanks Mora & Maire, PA

(57) ABSTRACT

A multi segment articulated Surface Effect Ship. Flexible air seals are formed between hull modules with a gas cushion contained between the side hulls under the entire length of the ship. In one embodiment the cushion formed may act as one continuous gas cushion whereby air cushion pressure generated or flowing from a leading car, or modular segment, flows rearward to supply or augment the cushion pressure necessary to support the following modules at the required operational draft. Hull configurations adaptable to the multi-unit, articulated surface effect ship described in the invention include conventional and air cushion assisted catamaran, trimaran and quadramaran designs and configurations. The ability to vary the cushion pressure at any point or area underneath the length of the ship gives the craft unique and novel passage-making abilities and extreme shallow draft capabilities that can be easily altered while underway to suite the routes and areas it serves in addition by dynamically adapting to varying sea states or other wave type and wave height conditions encountered during transit.

13 Claims, 1 Drawing Sheet

U.S. PATENT DOCUMENTS

| | | |
|---|---|---|
| 5,415,120 A | 5/1995 | Burg |
| 5,601,047 A | 2/1997 | Shen |
| 5,611,294 A | 3/1997 | Burg |
| 5,727,495 A | 3/1998 | Reslein |
| 5,746,146 A | 5/1998 | Bixel |
| 6,167,829 B1 | 1/2001 | Lang |
| 6,182,593 B1 * | 2/2001 | Wierick .................. 114/249 |
| 6,199,496 B1 | 3/2001 | Burg |
| 6,293,216 B1 | 9/2001 | Barsumian |
| 6,439,148 B1 | 8/2002 | Lang |
| 7,013,826 B2 | 3/2006 | Maloney |
| 2001/0039909 A1 | 11/2001 | Smith |
| 2004/0134402 A1 | 7/2004 | Schmidt |
| 2005/0211150 A1 | 9/2005 | Maloney |

OTHER PUBLICATIONS

Wolff, Douglas "The Articulated Tug-Barge—A Case Study" (undated prior art; citation not available).

"ACV Trailers and Heavy Lift Systems", *Jane's Surface Skimmers*, 1976-77.

"Seasnake: an alternative oil tanker", *The Naval Architect*, Jun. 2003.

"Tug-Barge Couplers", Intercontinental Engineering-Manufacturing Corporation, www.intercon.com/tug_barge.asp.

* cited by examiner

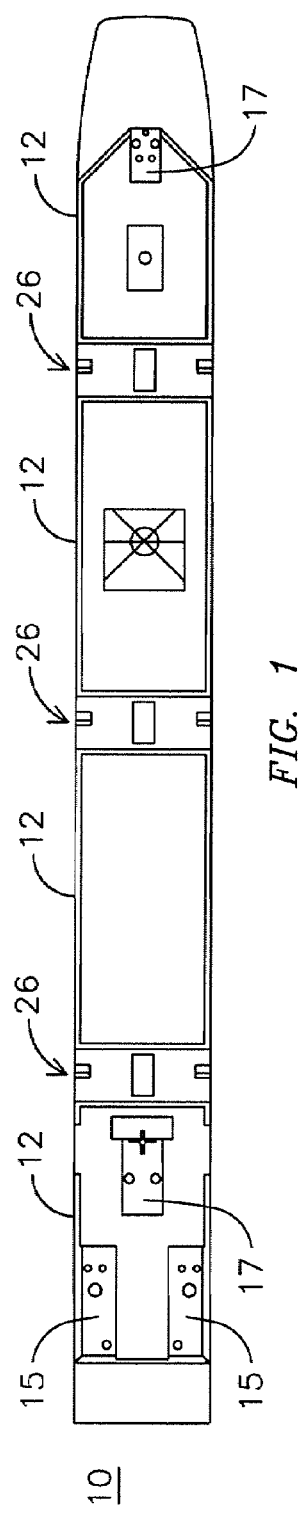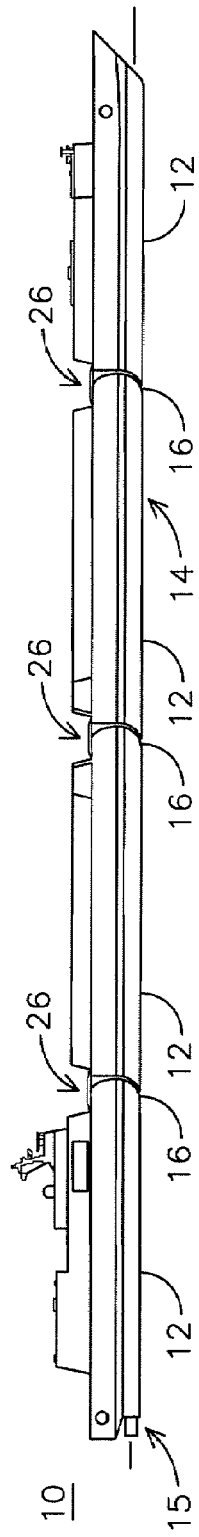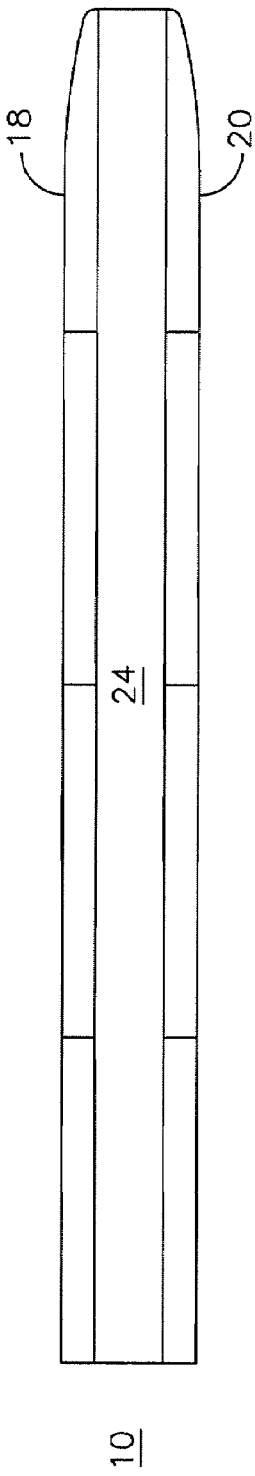

HIGH SPEED, MULTI-UNIT, ARTICULATED SURFACE EFFECT SHIP

BACKGROUND AND FIELD OF THE INVENTION

The invention relates to surface effect ships and, more particularly, to ship designs having reduced hydrodynamic friction for a given length over beam ratio.

BRIEF SUMMARY OF THE INVENTION

According to one embodiment of the invention a ship comprises multiple hull segment modules connected together to form an articulated vessel. According to another embodiment the aforesaid articulated vessel is operated with a contiguous air cushion to provide lift to support the vessel by supplying air into a closed gas cavity between one or more side hulls and between more than one joined hull segment module. In still another embodiment a multi segment surface effect ship is formed of multiple hull modules connected together to form a contiguous and articulated surface effect ship partially or fully supported by a pressurized gas cushion, wherein the contiguous gas cushion provides lift to support the entire vessel.

BRIEF DESCRIPTION OF THE DRAWING

FIG. 1 is a plan view of an exemplary ship comprising an arbitrary number hull modules connected to one another according to the invention;

FIG. 2 is an elevation view of the starboard side of the ship shown in FIG. 1; and FIG. 3 is a longitudinal view in cross section of port and starboard hulls of the ship shown in FIG. 1.

For clarity of illustration plan and side elevation views of each hull module shown in FIGS. 1, 2 and 3 are aligned, one over the other.

DETAILED DESCRIPTION OF THE INVENTION

The ship 10, according to an embodiment of the invention shown in FIGS. 1, 2 and 3, is a surface effect ship incorporating multiple gas cushion supported hull modules 12 joined together in an articulated and flexible manner to form a contiguous air cushion 14. This provides a marine transportation vessel having an extremely high length over beam (L/B) ratio with greatly reduced hydrodynamic friction, and hence lower power requirements, compared to current vessels or ships of similar size and capacity.

The illustrated embodiment of the invention is a high speed, multi-unit articulated Surface Effect Ship (S.E.S) analogous to a waterborne "train" that is comprised of one or more:

(A) Prime Movers (Manned or unmanned propulsion units that contain the Pilot house and engineering, power, control and navigation systems, similar to rail locomotives);

(B) Power Pods (Unmanned Auxiliary Power Units (APU's) that supply cushion gas, via lift fans, or locomotion to the SeaTrain, which can be located at any suitable point behind the Prime Mover and can be operated remotely by the Controlling Prime Mover) or (C) Cargo Cars (Similar to rail cars; these units can be configured for standardized ISO containers, specialized cargo carriers or as passenger, truck Roll on/Roll off (Ro/Ro) and automobile transport carriers or in any combination of cargo and passenger carriers.)

The illustrated multi segment articulated surface effect ship 10 includes flexible air seals 16 between hull modules 12 with a gas cushion containable between side hulls 18 and 20, and under the entire length of the ship 12. The cushion formed acts as one continuous gas cushion whereby air cushion pressure generated or flowing, for example, from a leading module 12 flows rearward to supply or augment the cushion pressure necessary to support the following modules at the required operational draft. Hull configurations adaptable to the multi-unit, articulated surface effect ship include conventional and air cushion assisted catamaran, trimaran and quadramaran designs and configurations. An exemplary catamaran design is shown in the figures. The ability to vary the cushion pressure at any point or area underneath the length of the ship gives the craft unique and novel passage making abilities and extremely shallow draft capabilities that can be easily altered while underway to suite the routes and areas served. In addition the ship 10 may be dynamically adapted to varying sea states or other wave type and wave height conditions encountered during transit.

The unique modular nature of ships according to the invention allows modifications of configurations to suit operational and logistical needs. This is similar to how rail freight and passenger trains add or remove locomotives and cars, as deemed necessary, giving the ship 10 improved logistical capabilities over conventional marine vessels. That is, embodiments according to the invention can be reconfigured to match the logistical needs of the trade or transport route assigned. Leading or following air seals located between the external hulls can be raised or lowered when necessary to maintain the desired gas cushion lift pressure along the entire length and beam of the craft. The unique ability of the ship 10 to add or remove segments during transits gives it the ability to meet port loading and unloading restrictions. The ability to reconfigure in transit allows the ship 10 to service shallow water ports with limited or no specialized cargo handling capabilities.

There has been illustrated an example of a multi segment surface effect ship comprised of multiple hull segments, one or more propulsion systems 15, one or more lift fan systems 17, and multiple hull segment modules connected together to form a contiguous and articulated surface effect ship partially or fully supported by a pressurized gas cushion. The contiguous air cushion provides lift to support the entire vessel. In a related method, air may be supplied into a closed gas cavity between one or more side hulls and between more than one joined hull segment, or platform modules, to lift the vessel and reduce drag. The air cushion pressure can be increased or decreased as a means for varying lift and hydrodynamic drag. The ship 10 is partially supported by at least two side hulls 18 and 20 that supply the hydrodynamic lift. The ship 10 is totally supported by the combination of air cushion pressure and hydrodynamic lift. The ship 10 may comprise one or more propulsion modules or one or more lift fan modules. The ship 10 includes one or more flexible skirts 16 between platform modules and one or more flexible linkages 26 between platform modules allowing, for example, at least 15 degrees of freedom in the horizontal, vertical and lateral (x, y, z) planes between the hull segment modules. The ship 10 may include one or more prime movers, or locomotives, one or more mechanical propulsion systems, or one or more fan lift systems. Ships according to the invention may include multiple covered or uncovered modular hull segments 12 each comprising a wet deck and one or more deck levels above the wet deck.

While one or more embodiments of the invention have been described, these are only exemplary and numerous modifications will be apparent to those skilled in the art. Accordingly, the scope of the invention is only limited by the claims which follow.

The claimed invention is:

1. A vessel comprising multiple hull segment modules connected together to form a contiguous and articulated ship wherein: all of the hull segment modules are partially or fully supportable by a pressurized contiguous gas cushion, providing lift to support the entire vessel as a surface effect ship; and connection of the multiple hull segment modules together forms at least two side hulls such that the vessel is supportable by the combination of air cushion pressure and hydrodynamic lift.

2. The vessel of claim 1 further comprising one or more propulsion systems and one or more lift fan systems.

3. The vessel of claim 1 comprising one or more flexible linkages between modules allowing at least 15 degrees of freedom in the horizontal, vertical and lateral (x, y, z) planes between the hull segment modules.

4. The vessel of claim 1 comprising one or more flexible linkages between modules allowing at least 15 degrees of freedom in at least one of the horizontal, vertical and lateral (x, y, z) planes between the hull segment modules.

5. The vessel in claim 1 wherein the multiple hull segment modules include one or more prime movers.

6. The vessel of claim 1 wherein some of the hull segment modules comprise a wet deck and one or more deck levels above the wet deck.

7. A vessel comprising:
multiple hull segment modules connected together to form a contiguous and articulated ship wherein all of the hull segment modules are partially or fully supportable by a pressurized contiguous gas cushion, providing lift to support the entire vessel as a surface effect ship; and
one or more lift fan systems coupled to provide the gas cushion.

8. The vessel of claim 7 wherein connection of the multiple hull segment modules together forms at least two side hulls such that with operation of the one or more lift fan systems the vessel is supported by a combination of air cushion pressure and hydrodynamic lift.

9. A vessel comprising:
multiple hull segment modules connected together to form a contiguous and articulated ship wherein all of the hull segment modules are partially or fully supportable by a pressurized contiguous gas cushion, providing lift to support the entire vessel as a surface effect ship; and
one or more flexible skirts positioned between modules.

10. The vessel of claim 9 including one or more mechanical propulsion systems.

11. The vessel of claim 9 including one or more fan lift systems.

12. The vessel of claim 9 wherein some of the hull segment modules comprise a wet deck and one or more deck levels above the wet deck.

13. The vessel of claim 9 wherein connection of the multiple hull segment modules together forms at least two side hulls such that with provision of the pressurized gas cushion the vessel is supported by a combination of air cushion pressure and hydrodynamic lift.

* * * * *